United States Patent
Nair et al.

(10) Patent No.: US 11,544,065 B2
(45) Date of Patent: Jan. 3, 2023

(54) BIT WIDTH RECONFIGURATION USING A SHADOW-LATCH CONFIGURED REGISTER FILE

(71) Applicant: ADVANCED MICRO DEVICES, INC., Santa Clara, CA (US)

(72) Inventors: Arun A. Nair, Santa Clara, CA (US); Todd Baumgartner, Fort Collins, CO (US); Michael Estlick, Fort Collins, CO (US); Erik Swanson, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/585,817

(22) Filed: Sep. 27, 2019

(65) Prior Publication Data

US 2021/0096862 A1 Apr. 1, 2021

(51) Int. Cl.
*G06F 9/30* (2018.01)

(52) U.S. Cl.
CPC ........ *G06F 9/30101* (2013.01); *G06F 9/3013* (2013.01); *G06F 9/30014* (2013.01);
(Continued)

(58) Field of Classification Search
CPC ............. G06F 9/30098; G06F 9/30116; G06F 9/30101; G06F 9/30014; G06F 9/30189;
(Continued)

(56) References Cited

U.S. PATENT DOCUMENTS 5,986,962 A  11/1999 Bertin et al.
6,240,031 B1  5/2001 Mehotra et al.
(Continued)

FOREIGN PATENT DOCUMENTS

KR  10-2010-009421   8/2010
KR  10-2011-0127757  11/2011

OTHER PUBLICATIONS

T. Edamatsu and D. Takahashi, "Acceleration of Large Integer Multiplication with Intel AVX-512 Instructions," 2018 IEEE 20th International Conference on High Performance Computing and Communications; pp. 211-218 (Year: 2018).*
(Continued)

*Primary Examiner* — Jyoti Mehta
*Assistant Examiner* — Kasim Alli

(57) ABSTRACT

A processor includes a front-end with an instruction set that operates at a first bit width and a floating point unit coupled to receive the instruction set in the processor that operates at the first bit width. The floating point unit operates at a second bit width and, based upon a bit width assessment of the instruction set provided to the floating point unit, the floating point unit employs a shadow-latch configured floating point register file to perform bit width reconfiguration. The shadow-latch configured floating point register file includes a plurality of regular latches and a plurality of shadow latches for storing data that is to be either read from or written to the shadow latches. The bit width reconfiguration enables the floating point unit that operates at the second bit width to operate on the instruction set received at the first bit width.

22 Claims, 5 Drawing Sheets

(52) U.S. Cl.
CPC ...... *G06F 9/30116* (2013.01); *G06F 9/30138* (2013.01); *G06F 9/30189* (2013.01)

(58) Field of Classification Search
CPC . G06F 9/3013; G06F 9/30112; G06F 9/30138
See application file for complete search history.

(56) References Cited

U.S. PATENT DOCUMENTS

| | | | |
|---|---|---|---|
| 6,298,431 | B1 | 10/2001 | Gottlieb |
| 6,608,775 | B2* | 8/2003 | Lu .......................... G11C 8/16 365/154 |
| 6,810,475 | B1 | 10/2004 | Tardieux |
| 6,877,084 | B1* | 4/2005 | Christie .............. G06F 9/30036 711/125 |
| 7,069,411 | B1 | 6/2006 | McMinn et al. |
| 7,398,347 | B1* | 7/2008 | Pechanek ............ G06F 9/30014 711/100 |
| 8,140,829 | B2 | 3/2012 | Eickemeyer et al. |
| 9,639,369 | B2* | 5/2017 | Blasco ................ G06F 9/30112 |
| 2001/0047468 | A1 | 11/2001 | Parady |
| 2002/0087837 | A1 | 7/2002 | Samra et al. |
| 2002/0144090 | A1 | 10/2002 | Ronen et al. |
| 2003/0023836 | A1 | 1/2003 | Catherwood et al. |
| 2003/0172256 | A1 | 9/2003 | Soltis, Jr. et al. |
| 2004/0133766 | A1 | 7/2004 | Abraham et al. |
| 2004/0172522 | A1 | 9/2004 | Biswas et al. |
| 2005/0041450 | A1 | 2/2005 | Duh et al. |
| 2005/0066096 | A1 | 3/2005 | Ruemmler et al. |
| 2005/0081018 | A1 | 4/2005 | Luick |
| 2005/0138323 | A1 | 6/2005 | Snyder |
| 2006/0288190 | A1 | 12/2006 | Shoemaker |
| 2006/0294344 | A1 | 12/2006 | Hsu et al. |
| 2007/0106885 | A1 | 5/2007 | Rychlik |
| 2007/0294515 | A1 | 12/2007 | Luick |
| 2008/0209184 | A1 | 8/2008 | Ahmed et al. |
| 2008/0209185 | A1* | 8/2008 | Ahmed ................ G06F 9/30189 712/222 |
| 2009/0231935 | A1 | 9/2009 | Golla et al. |
| 2010/0205387 | A1 | 8/2010 | Sun et al. |
| 2011/0004644 | A1* | 1/2011 | Henry ................ G06F 9/30014 708/231 |
| 2011/0241744 | A1* | 10/2011 | Moudgill ............ G06F 9/30141 327/202 |
| 2013/0275700 | A1 | 10/2013 | Wang et al. |
| 2016/0086678 | A1 | 3/2016 | Botea et al. |
| 2016/0371087 | A1 | 12/2016 | Le et al. |
| 2017/0060593 | A1 | 3/2017 | Krishna et al. |
| 2019/0080737 | A1 | 3/2019 | Nguyen et al. |

OTHER PUBLICATIONS

Jason Cong, Yiping Fan, Guoling Han, Ashok Jagannathan, Glenn Reinman, and Zhiru Zhang. Instruction set extension with shadow registers for configurable processors. In Proceedings of the 2005 ACM/SIGDA 13th international symposium on Field-programmable gate arrays (FPGA '05). pp 99-106 (Year: 2005).*

Hardell, WR, Jr Lewis, FD Maule, WE, "Shadow Latches for Synchronized Reading of Error Registers", pp. 454-455 (Year: 1990).*

U.S. Appl. No. 16/668,469, filed Oct. 30, 2019, listing Michael Estlick et al. as inventor(s), entitled "Shadow Latches in a Shadow-Latch Configured Register File for Thread Storage", 29 pages.

International Search Report and Written Opinion for counterpart Application No. PCT/US2020/052756, 12 pages.

U.S. Appl. No. 16/877,112, filed May 18, 2020, listing Arun A. Nair et al. as inventors, entitled "Methods and Systems for Utilizing a Master-Shadow Physical Register File", 55 pages.

International Search Report and Written Opinion for PCT/US2020/057945 dated Feb. 16, 2021, 10 pages.

Oguz Ergin et al., "Increasing Processor Performance Through Early Register Release", IEEE International Conference on Computer Design: VLSI in Computers and Processors, 2004, Nov. 1, 2004, 8 pages.

Non-Final Office Action dated Jul. 6, 2021 for U.S. Appl. No. 16/668,469, 38 pages.

Final Office Action dated Nov. 23, 2021 for U.S. Appl. No. 16/668,469, 27 pages.

Non-Final Rejection dated Jul. 29, 2021 for U.S. Appl. No. 16/877,112, 11 pages.

International Search Report and Written Opinion dated Sep. 6, 2021 for Application No. PCT/US2021/032992, 12 Pages.

International Preliminary Report on Patentability dated Apr. 7, 2022 for Application No. PCT/US2020/052756, 9 Pages.

Final Office Action dated Mar. 25, 2022 for U.S. Appl. No. 16/877,112, 21 pages.

International Preliminary Report on Patentability dated May 12, 2022 for PCT/US2020/057945, 7 pages.

Non-Final Office Action issued in U.S. Appl. No. 16/668,469 dated Jun. 28, 2022, 31 Pages.

* cited by examiner

SHADOW LATCH CONFIGURE
REGISTER FILE
120

BIT WIDTH RECONFIGURATION USING A SHADOW-LATCH CONFIGURED REGISTER FILE

BACKGROUND

Processors employ various structures to store data for use during processing activities. One type of data structure is a register file. A typical register file stores data in functional latches that are associated with an entry that may be written to or read from in parallel. In order to access the data stored in the functional latches, typical processors utilize split renaming in order to "split" registers into high bit registers and low bit registers. Split-renaming allows the processor to implement registers wider than the native width of the processor. In particular, the high bit portion of a register and low bit portion of the register are assigned different identifiers, or names, by the microprocessor, so that the register is logically treated as two different registers. For example, several currently available microprocessors split rename 256-bit registers into a high 128-bit register and a low 128-bit register. Split renaming registers into high and low registers results in an increase in the amount register space required to perform computational operations. For example, split renaming the 256-bit register described above into high and low 128-bit registers requires twice the number of entries and area in the physical register file. The increased size of the physical register file required for split renaming results in an increase in manufacturing costs as more microprocessor space is required to perform the split renaming operations.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate systems and techniques that support bit width reconfiguration of registers in a processor core of a processor in accordance with some embodiments. A floating point unit in the processor includes a shadow-latch configured floating point register file that reconfigures a bit width from a first bit width (e.g., 256-bit width) to a second bit width (e.g., 512-bit width) based on the availability of shadow latches in the shadow-latch configured floating point register file, so that the floating point unit that operates at the first bit width is usable in a processor that operates at a second bit width. The shadow-latch configured floating point register file includes shadow latches, regular latches, and shadow select multiplexers (MUXs) that are used for bit width reconfiguration during, for example, read and write data operations that utilize the floating point unit.

In order to perform the bit width reconfiguration, during a first and second clock cycle operation, the first 256-bits of the 512-bit operation are stored in the regular latches and the second 256-bits are stored in the shadow latches within the shadow-latch configured floating point register file of the same single entry. During, for example, a 512-bit read or write operation, the first 256-bits are accessed from the shadow-latch configured floating point register file during a first clock cycle and the second 256-bits are accessed during a second clock cycle, where both accesses occur from the same entry. Because both the first 256-bits and the second 256-bits are stored in a single entry in the shadow-latch configured floating point register file, split-renaming is not required in order to reconfigure the bit width for 512-bit operation. That is, by utilizing the shadow-latch configured floating point register file, split-renaming that normally splits 512-bit instructions into two separate registers (i.e., a high bit register and a low-bit register) is not required in order to have the floating point unit operate on the 512-bit instruction set.

Figure 1:
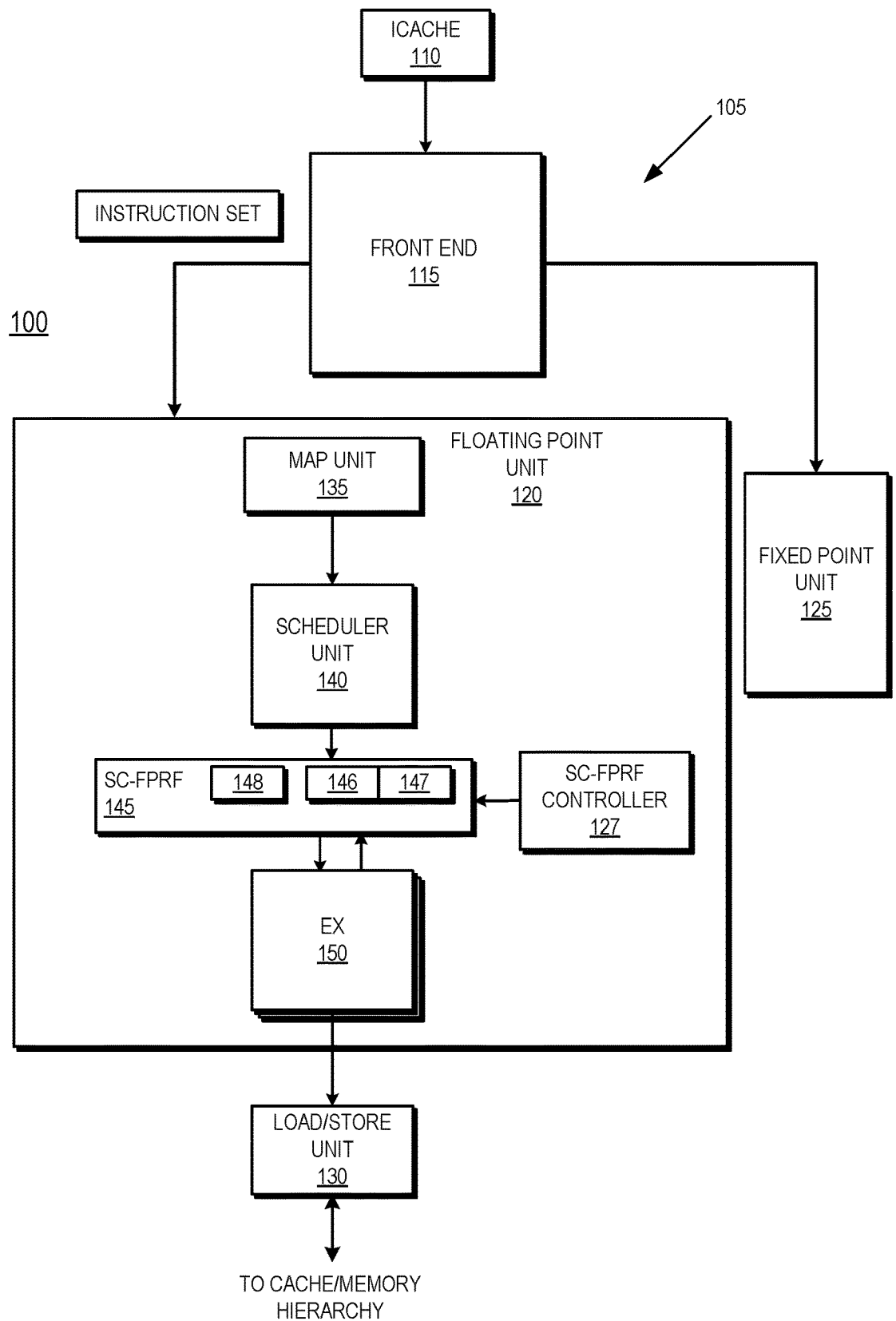
FIG. 1 is a block diagram of a processor core that supports bit width reconfiguration of a register using shadow latches in accordance with some embodiments.

FIG. 1 illustrates a processor core 100 of a processor having an execution pipeline 105 that supports bit width reconfiguration in accordance with some embodiments. In some embodiments, the illustrated processor core 100 includes, for example, a central processing unit (CPU) core based on an x86 instruction set architecture (ISA), an ARM ISA, and the like. The processor implements a plurality of such processor cores, and the processor is implemented in one of a variety of electronic devices, such as a notebook computer, desktop computer, tablet computer, server, computing-enabled cellular phone, personal digital assistant (PDA), set-top box, game console, and the like.

In some embodiments, the processor utilized for processor core 100 supports the x86 architecture that supports execution of two types of vector arithmetic instructions: Streaming Single Instruction Multiple Data (SIMD) Extensions (SSE) instructions and Advanced Vector eXtension (AVX) instructions. AVX instructions manipulate 256-bit operands and SSE instructions manipulate 128-bit operands. AVX-512 instructions are 512-bit extensions to the 256-bit AVX SIMD instructions for x86 instruction set architecture (ISA). Accordingly, a processor that employs a register file with 512-bit registers supports execution of both AVX and SSE instructions. In some embodiments, utilizing the shadow-latch configured floating point register file described herein, a processor or processing unit (such as the floating point unit 120) that employs a register file with 256-bit registers, also supports 512-bit operations.

In the depicted example, the execution pipeline 105 includes an instruction cache 110 ("Icache"), a front end 115, floating point unit 120, and fixed point unit 125 (also commonly referred to as "integer execution units"). The processor core 100 also includes a load store unit (LSU) 130 coupled to a memory hierarchy (not shown), including one or more levels of cache (e.g., L1 cache, L2, cache, etc.), a system memory, such as system RAM, and one or more mass storage devices, such as a solid-state drive (SSD) or an optical drive.

The instruction cache 110 stores instruction set data that is fetched by a fetch unit (not shown) of the front end 115 in response to demand fetch operations (e.g., a fetch to request the next instruction in the instruction stream identified by the program counter) or in response to speculative prefetch operations. The front end 115 decodes instructions fetched by the fetch unit into one or more operations that are to be performed, or executed, by either the floating point unit 120 or the fixed point unit 125. Those operations involving floating point calculations are dispatched to the floating point unit 120 for execution, whereas operations involving fixed point calculations are dispatched to the fixed point unit 125.

As used herein, a type of instruction refers to a size of the operands manipulated by the instruction. Thus, instructions of different types manipulate operands of different sizes. For example, in some embodiments the floating point unit 120 executes operations decoded from instructions that manipulate 128-bit operands (referred to as 128-bit instructions) and also executes operations decoded from instructions that manipulate 256-bit operands (referred to as 256-bit instructions). In addition, floating point unit 120, utilizing the bit width reconfiguration techniques described herein, executes operations decoded from instructions that manipulate 512-bit operands (referred to as 512-bit instructions).

In some embodiments, the floating point unit (FPU) 120 includes a map unit 135, a scheduler unit 140, a shadow-latch configured floating point register file (SC-FPRF) 145, and one or more execution (EX) units 150. In some embodiments, FPU 120 carries out operations on floating point numbers and performs operations including addition, subtraction, multiplication, division, square root, and bit shifting or broadcasting, as well as transcendental functions such as exponential functions, trigonometric functions, and the like. In various embodiments, the FPU 120 supports operation of various graphics processing units (GPUs) and central processing units (CPUs). For example, if the CPU encounters an instruction that requires performing a floating-point operation, the CPU transmits a request to the FPU 120, which carries out the operation and returns the results to the CPU. Although the FPU 120 shown in FIG. 1 is implemented internally to the processor core 100, in other embodiments FPU 120 is implemented externally to the GPU and the CPU.

The SC-FPRF 145, utilizing the additional shadow latches 147 and shadow select MUXs 148, stores instructions, operands used by the instructions, and results of executed instructions. Entries in the SC-FPRF 145 are indicated by physical register numbers. In some embodiments, the physical register numbers are mapped (or renamed) using map unit 135 to architectural register numbers that are defined by an instruction set architecture. Typically, a queue entry maintained by the scheduler unit 140 includes a field to store the operation payload or operation identifier (e.g., the opcode for the operation), fields for the addresses or other identifiers of physical registers that contain the source operand(s) for the operation, fields to store any immediate or displacement values to be used with the operation, a destination field that identifies the physical register in which the result of the execution of the corresponding operation is to be stored, and at least one field to store instruction dependency information. For example, a load instruction includes address information indicating the target of the load instruction and an architected register operand indicating the PRN in the SC-FPRF 145 that receives the data from the target address.

In addition to operating on instructions that operate at a first bit width (256-bit width), the FPU 120 operates on instructions that operate at a second bit-width that include a relatively large number of bits, e.g., on 512-bit instructions. That is, in some embodiments, even though the datapaths of FPU 120 are limited to 256-bit instructions, FPU 120 is able to utilize the SC-FPRF 145 to reconfigure the 256-bit datapath to operate on 512-bit instructions by extending the instruction operation or transaction from a single clock cycle to two clock cycles (e.g., a first clock cycle and a second clock cycle). Thus, in some embodiments, when the SC-FPRF 145 is a 512-bit register file (i.e., stores the lower 256 bits in regular latches 146 and the upper 256 bits in the shadow latches 147), access to the 512 bits occurs over two 256-bit cycles, instead on one 512-bit cycle.

In some embodiments, for example, during a read operation, when the execution units 150 read data from the SC-FPRF 145, the lower 256 bits are read from the regular latches 146 in the first cycle of the transaction and the upper 256-bits are read from the shadow latches 147 in the second cycle of the transaction. Using a read address provided to the shadow select MUXs 148, the shadow select MUXs 148 utilize a read function to select which shadow latch of the shadow latches 147 to read during the second cycle of the read operation. In some embodiments, in order to perform the read operation, the read function is added to the SC-FPRF 145 that is used to determine whether to read the shadow data stored in the shadow latches or the normal data stored in the regular latches. Thus, the read function allows the execution units 150 to select the data to read using the shadow select MUXs 148.

Similarly, during a write operation, when either the schedule unit 140 or the execution units 150 perform a write operation to SC-FPRF 145, the lower 256 bits are written to the regular latches 146 during the first cycle of the transaction and the upper 256 bits are written to the shadow latches 147 during the second cycle of the transaction. During the write operation, no additional write logic is required compared to traditional register files because the additional 256 bits that are being written are not being written as a separate entry, i.e., the additional 256 bits are a shadow piece of data associated with the regular latches in the same entry.

In some embodiments, at the input to the interface to SC-FPRF 145, a write control signal and a read control signal are provided from a SC-FPRF controller 127 that dictates whether the read operation or the write operation is going to occur during the second cycle. During the write operation, if a write control signal (e.g., Is512 write control input signal) provided from SC-FPRF controller 127 is set to a high logic value when the transaction starts, the clock for the shadow write is activated during the second cycle. That is, the Is512 write control input signal causes the shadow write clock to fire in the second cycle of the two cycles. For a read operation, when a read control signal (e.g., Is512 read control input signal) provided from SC-FPRF controller 127 is set to a high logic value when the transaction starts, the shadow select MUX 148 selects the shadow latch to be read based upon the read address provided to the shadow select MUX 148 during the second cycle. That is, the Is512 read control input signal causes the shadow select MUX 148 to choose the shadow latch 147 corresponding to the requested address for reading in the second cycle. In other words, in the second cycle of the transaction data from the shadow latch 147 is selected by the shadow select MUX 148. As a result of using the SC-FPRF 145, in various embodiments, the read decoders and the write decoders are not clocked for the second cycle, holding the decoded values steady and saving power while executing instructions in processor core 100.

In some embodiments, since the control signal for the shadow select MUX 148 arrives ahead of schedule, i.e., within the first cycle of the transaction, the signal provided to the shadow select MUX (i.e., a shadow select MUX signal) provided by, for example, a flip flop, hides the timing associated with adding the additional shadow select MUX 148, essentially nullifying the effect of having to switch the additional shadow select MUX 148 that has been added to the register file.

In some embodiments, activation of FPU 120 for 512-bit operations or 256-bit operations is dependent on the configuration of SC-FPRF controller 127. When the micro-operation to be executed is a 512-bit instruction, then SC-FPRF controller 127 enables the FPU 120 for 512-bit operations. When the micro-operation to be executed is a 256-bit instruction, then SC-FPRF controller 127 enables the FPU 120 for 512-bit operations. That is, in order for the FPU 120 to determine whether a 512-bit operation or 256-bit operation is to occur, SC-FPRF controller 127 activates the FPU 120 as either a 512-bit operator or a 256-bit operator. When the FPU 120 is not enabled for 512-bit read or write operations, a 256-bit read or write operation is activated and occurs in a single cycle. When the FPU 120 is enabled for 512-bit read or write operations, 512-bit read or write operation is activated and it takes two clock cycles on a given port to do the 512 operation.

In some embodiments, since FPU 120 is a 256-bit wide FPU with two cycles of 256-bits being used to execute the 512-bit operation, scheduler unit 140 in FPU 120 blocks acceptance of a second micro-op during the second cycle in order to allow the first micro-op to complete during the first and second cycle. That is, since execution of the 512-bit operation by FPU 120 takes two cycles, scheduler unit 140 in FPU 120 is flagged by SC-FPRF controller 127 that the 512-bit micro-ops take two cycles and prevents another micro-op or another transaction from commencing during the second cycle.

Similarly, load store unit 130 operates in both 512-bit operations and 256-bit operations. Load store unit 130 is flagged by SC-FPRF controller 127 that FPU 120 is executing 512-bit micro-ops. As load store unit 130 handles the 512-bit loads and store with internal 256-bit datapaths, the lower 256-bits of the 512-bit operation are executed during the first cycle and the upper 256-bits are executed during the second cycle, matching the SC-FPRF 145 and execution pipes. Thus, in some embodiments, both the load store unit 130 interface and the FPU 120 interface are 256-bits wide.

In some embodiments, executing 512-bit micro-ops in FPU 120 allows 512-bit instructions to use a single entry in the retire queue (not shown) and many other structures in processor core 100, such as, for example, a load queue, and a scheduler in EX 150. Using a single entry improves performance over, for example, split renaming, which splits 512-bit instructions into two 256-bit micro-ops. In some embodiments, the shadow-latch configured floating point register file scheme described herein is extended to multiple latches and cycles, such as, four latches and four cycles to perform 512-bit operations with 128-bit datapaths.

Figure 2:
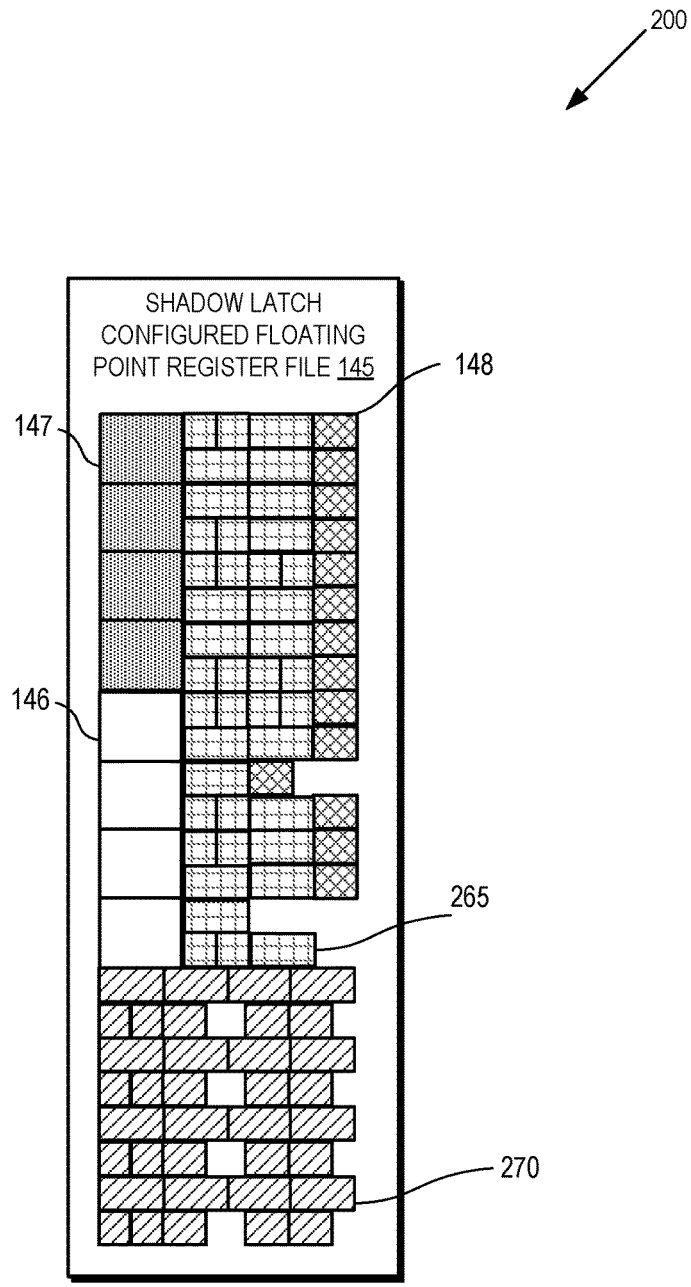
FIG. 2 is a bitcell layout of a shadow-latch configured floating point register file in the processor core of FIG. 1 in accordance with some embodiments.

In order to use the SC-FPRF 145 to implement 512-bit renaming and 512-bit micro-ops, with 256-bit datapaths, in addition to the regular latches that normally used store data in a register file, and an additional set of shadow latches are added per entry in the register file (depicted in detail with reference to FIG. 2). Further, a second write clock is added to the floating point unit 120 to allow the shadow latch to be written to.

The scheduler unit 140 schedules instructions for execution in the FPU 120. In addition, because the SC-FPRF 145 uses two cycles to perform a single cycle operation, scheduler unit 140 is adapted to accommodate for the additional cycle needed to perform the two cycle operation. As a result, scheduler unit 140 in the floating point unit 120 blocks or delays accepting another micro-op for an additional cycle, until the two cycle operation has completed. That is, in one embodiment, scheduler unit 140 understands that 512-bit micro-ops take two cycles and block taking another micro-op or another transaction in that second cycle. In some embodiments, the floating point unit 120 also requires the scheduler (scheduler unit 140) to discern that 512-bit micro-ops take two cycles in the register file and execution pipelines.

Load store unit 130 performs load and store operations over two cycles instead of a single cycle in order to adjust for the additional cycle added for the shadow latch operations. Thus, for example, for a 512-bit operation, the load store unit 130 performs 512-bit loads and stores with 256-bit data paths over two cycles, instead of a single cycle.

In various embodiments, although the FPU 120 performs its entire operations using 256-bit datapaths, the decoder (not shown) decodes the 512-bit operation using 512-bit datapaths, instead of 256 bits. In other words, the decoder is not aware that the FPU 120 operates using a 256-bit datapath, and instead performs as the decoder normally would for a 512-bit operation.

In some embodiments, the shadow select multiplexer signal is output by a local flip-flop, since the shadow select multiplexer signal comes along with the first cycle transaction. In some embodiments, outputting the shadow select multiplexer signal from the local flip-flop allows the processor to be faster than the read decode, and hides the timing through the extra or additional shadow select multiplexer.

Although the following description is related to a shadow-latch configured floating point register file 145 that is implemented in the floating point unit 120, it applies to any type of register file or shadow-latch configured register file that is implemented for, for example, the fixed point unit 125, or an entirely different type of processing unit, such as a digital signal processor, a graphics processor, an application specific integrated circuit (ASIC), etc. The SC-FPRF 145 includes functional latches, shadow latches and shadow select multiplexers that allow data to be read to and written from the functional latches and shadow latches (discussed further below with reference to FIG. 2).

FIG. 2 is a bitcell layout of the SC-FPRF 145 of FIG. 1 that employs bit width reconfiguration using shadow latches in accordance with some embodiments. SC-FPRF 145 includes shadow latches 147, shadow select MUXs 148, functional or regular latches 146, read logic units (read logic) 265, and write logic units (write logic) 270. In the illustrated example, shadow latches 147 include a plurality of shadow latches, shadow select MUXs 148 include a plurality of shadow select multiplexers, regular latches 146 include a plurality of regular latches, read logic units 265 include a plurality of read logic units, write logic units 270 include a plurality of write logic units. In some embodiments, each shadow latch 147 and regular latch 146 perform the latching operations that store the data that is to be written and read to the SC-FPRF 145 during bit width reconfiguration operations. Each shadow select MUX 148 is used to select the data that is be read from the SC-FPRF 145 during bit width reconfiguration operations. In some embodiments, read logic unit 265 and write logic unit 270 include the logic that is used to perform the read and write operations as is generally known in the art.

As depicted in FIG. 2, for a bit width reconfiguration of a 512-bit operation, FPU 120 (having a 256-datapath), stores the first 256-bits in regular latches 146 and the second 256-bits in shadow latches 147 during two clock cycles. That is, during a write operation, in the first cycle, regular latches 146 store the lower 256-bits of associated with the 512-bit operation. In the second cycle, shadow latches 147 store the upper 256-bits of the 512-bit operation. During a read operation, in the first cycle, data is read from the regular latches 146. In the second cycle, the shadow latches 147 that have been selected by shadow select MUXs 148 are read from and provided to EX 150 (as illustrated in FIGS. 1 and 3).

Figure 3:
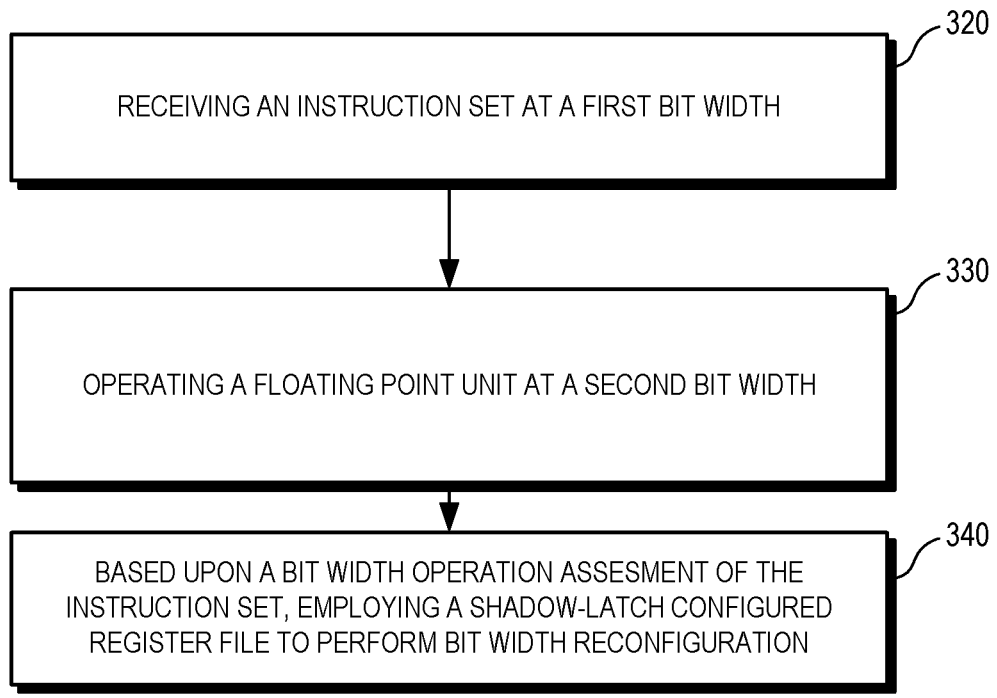
FIG. 3 is a flow diagram of a method employing bit width reconfiguration using shadow latches in the processor core of FIG. 1 in accordance with some embodiments.

FIG. 3 illustrates a method 300 of employing shadow latching using the processor core of FIG. 1 in accordance with some embodiments. At block 310, an instruction set having a data operation (e.g., a read operation or write operation) is initiated by processor core 100 to the floating point unit 120. At block 330, the floating point unit 120 operates on the instruction set at a second bit width. At block 340, based upon on a bit width operation assessment of the instruction set, the floating point unit 120 employs a SC-FPRF 145 to perform bit width reconfiguration. For example, in some embodiments, the bit width operation assessment of the instruction set includes determining whether the bit width of the instruction set is a 512-bit operation or a 256-bit operation and determining whether the data operation to be performed by the floating point unit 120 is a read operation, a write operation, or both a read operation and a write operation. In some embodiments, determining whether the bit width of the instruction set is 512-bits or 256-bits dictates whether the floating point unit 120 will be performing bit width reconfiguration during floating point operations, or simply performing floating point operations at the prescribed 256-bits (the bitwidth of the datapath of the floating point unit 120). In some embodiments, determining whether the data operation to be performed by floating point unit 120 is a read operation or a write operation, will activate either a write control signal or a read control signal that dictates the timing of accessing the shadow latches and the shadow latches that are to be accessed using the shadow select MUXs 148 for read and write operations in the floating point unit 120.

Figure 4:
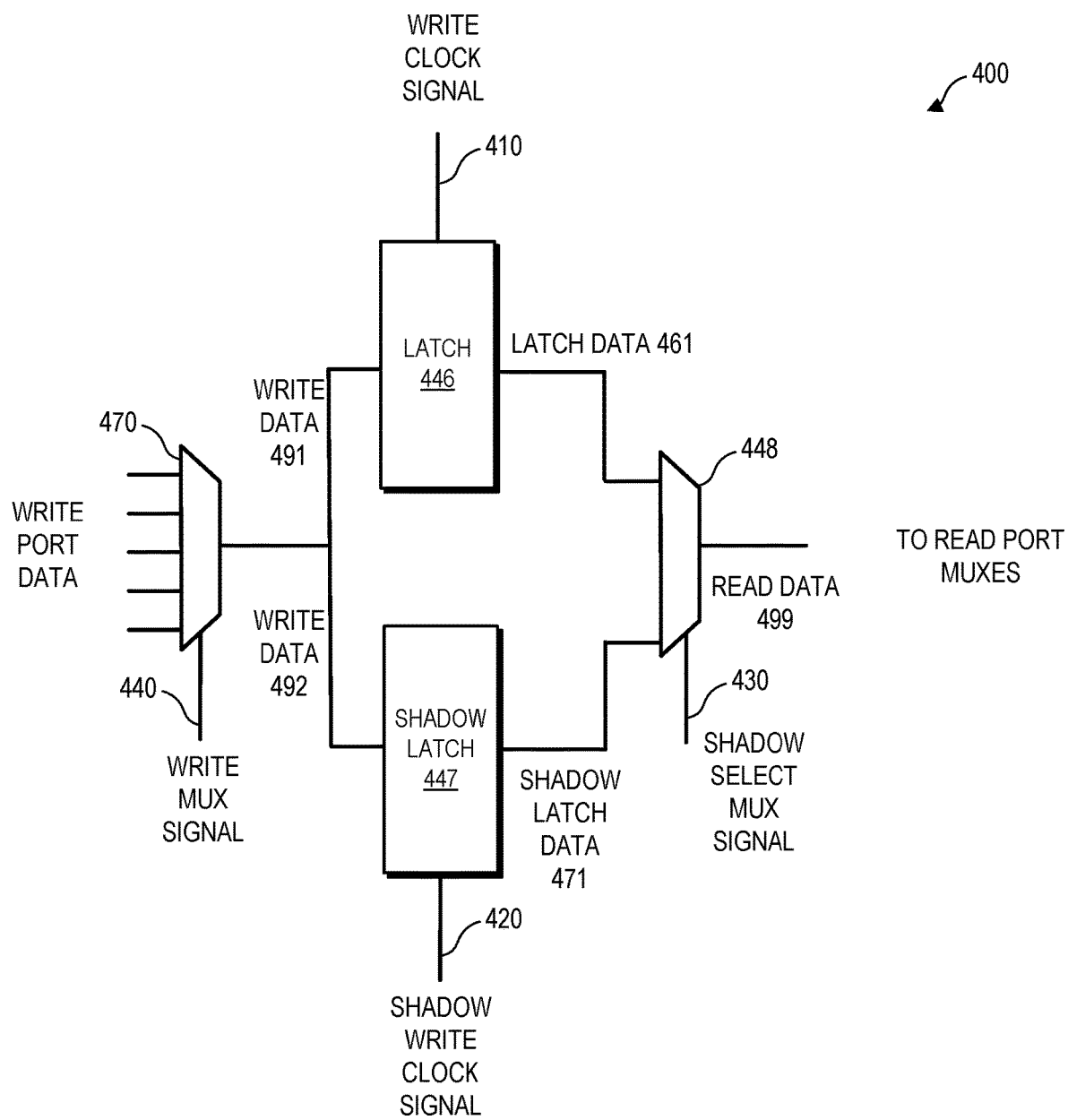
FIG. 4 is a block diagram of a shadow-latch configured floating point register file in the processor core of FIG. 1 in accordance with some embodiments.

FIG. 4 is a block diagram of SC-FPRF 145 of the processor core 100 of FIG. 1 in accordance with some embodiments. SC-FPRF 145 includes a write MUX 470, regular latch 446, shadow latch 447, shadow select MUX 448. In various embodiments, the two latches (e.g., regular latch 446 and shadow latch 447) share a single write MUX 470, but utilize different write clocks (e.g., write clock signal 410 and shadow write clock signal 420) during the writing process.

During a write operation, at the write port of SC-FPRF 145, write MUX 470 receives write data (e.g., 512-bit data) that is to be written to regular latch 446 and shadow latch 447. Based on write MUX signal 440, when the write clock signal 410 logic value is high, write MUX 470 directs write data 491 to be written to regular latch 446. When the shadow write clock signal 420 logic value is high, write MUX 470 directs write data 492 to shadow latch 447. Regular latch 446 and shadow latch 447 store the received write data 491 and write data 492, respectively. During a read operation, regular latch 446 and shadow latch 447 release latch data 461 and shadow latch data 471 based on, for example, the logic value of shadow select MUX signal 430 that controls shadow select MUX 448. In some embodiments, when, for example, the logic value of shadow select MUX signal 430 is low, latch data 461 is read from latch 446 as read data 499. When shadow select MUX signal 430 is high, shadow latch data 471 is read from shadow latch 447 as read data 499. Read data 499 is then provided via read port MUXs to execution unit 150 as output of SC-FPRF 145.

Figure 5:
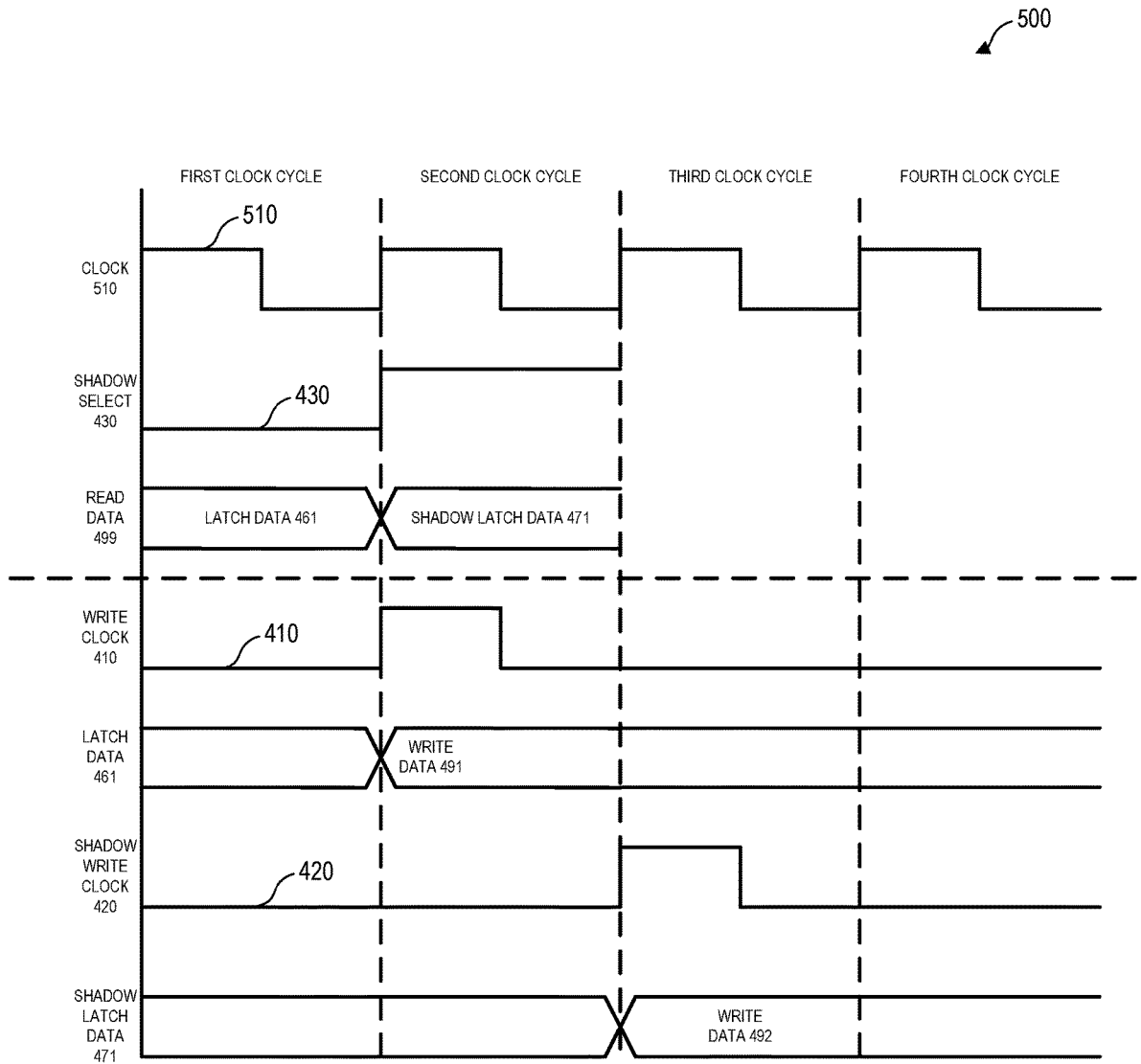
FIG. 5 is a timing diagram utilized in the shadow-latch configured floating point register file in the processor core of FIG. 4 in accordance with some embodiments.

FIG. 5 is a timing diagram 500 of read and write operations utilizing SC-FPRF 145 of FIG. 4 in accordance with some embodiments. Timing diagram 500 depicts a clock signal 510, shadow select MUX signal 430, read data 499, write clock signal 410, latch data 461, shadow write clock signal 420, and shadow latch data 471. In the embodiment shown, timing diagram 500 illustrates four clock cycles, however, a varying number of clock cycles is utilized in alternate embodiments.

For the write operation, during the first clock cycle, write clock signal 410 and shadow write clock signal 420 are low and data is not being written to regular latch 446 or shadow latch 447. At the end of the first clock cycle, write clock signal 410 transitions from low to high and, as a result, write data 491 is written to regular latch 446. Shadow write clock signal 420 remains low during the transition and data is not written to shadow latch 447 during the second cycle. At the end of the second clock cycle, write clock signal 410, which transitioned to low mid-second clock cycle remains low and no data is written to regular latch 446 during the third cycle. Shadow write clock signal 420, at the end of the second clock cycle, transitions from low to high and write data 492 is written to shadow latch 447. At the end of the third clock cycle, write clock signal 410 and shadow write clock signal 420 remain low and no data is written to regular latch 446 and shadow latch 447 during the fourth clock cycle, respectively. For the read operation, during the first clock cycle, shadow select MUX signal 430 is low and data is not being read from shadow latch 447, while latch data 461 is being read from regular latch 446. At the end of the first cycle, when shadow select MUX signal 430 transitions from low to high, shadow latch data 471 is read from shadow latch 447. Together, latch data 461 and shadow latch data 471 are combined to provide the desired bit width configuration at the output of SC-FPRF 145 of FIG. 1.

A computer readable storage medium may include any non-transitory storage medium, or combination of non-transitory storage media, accessible by a computer system during use to provide instructions and/or data to the computer system. Such storage media includes, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processor, comprising:
a front-end with an instruction set operating at a first bit width; and
a floating point unit coupled to receive the instruction set, the floating point unit operating at a second bit width, wherein the floating point unit includes employs a shadow-latch configured register file that includes a plurality of regular latches and a plurality of shadow latches, wherein, as part of a bit width reconfiguration, a first regular latch is to store a first portion of an operand and a corresponding first shadow latch is to store a second portion of the operand, wherein the first regular latch and the first shadow latch share an address, and wherein, during a read operation, the first regular latch is read from during a first clock cycle and the first shadow latch is read from during a second clock cycle.

2. The processor of claim 1, wherein:
the bit width reconfiguration enables the floating point unit that operates at the second bit width to operate on the instruction set received at the first bit width.

3. The processor of claim 1, wherein:
at least one of the plurality of regular latches store a plurality of lower bits of a first bit width operation and at least one of the plurality of shadow latches store a plurality of upper bits associated with the first bit width operation.

4. The processor of claim 3, wherein:
the first bit width operation is a 512-bit width operation and the second bit width is 256 bits.

5. The processor of claim 1, wherein:
during the read operation, at least one of a plurality of shadow multiplexers (MUXs) is used to select between the first shadow latch and the first regular latch to read from.

6. The processor of claim 1, wherein:
during a write operation, at least one shadow latch of the plurality of shadow latches is activated using a write control signal during a third clock cycle of a plurality of clock cycles.

7. The processor of claim 1, wherein:
during the read operation, the first regular latch of is activated by a read control signal during the first clock cycle and the first shadow latch is activated by the read control signal during the second clock cycle.

8. The processor of claim 7, wherein:
the read control signal causes a first shadow multiplexer (MUX) of a plurality of shadow MUXs to select the first regular latch during the first clock cycle and the first shadow latch during the second clock cycle.

9. The processor of claim 1, wherein:
wherein the shadow latches are located in a single entry in the shadow-latch configured register file.

10. The processor of claim 1, wherein:
employing the shadow-latch configured register file to perform the bit width reconfiguration includes operating on the first portion of the operand during a particular clock cycle, and operating on one or more additional portions of the operand during one or more successive clock cycles.

11. The processor of claim 10, wherein:
each of the first portion of the operand and the one or more additional portions of the operand have the second bit width.

12. The processor of claim 1, wherein:
the shadow-latch configured register file includes a plurality of write multiplexers (MUXs) coupled to the plurality of shadow latches and to the plurality of regular latches.

13. A method, comprising:
receiving an instruction set operating at a first bit width;
operating a floating point unit at a second bit width; and
employing a shadow-latch configured register file that includes a plurality of regular latches and a plurality of shadow latches, wherein a bit width reconfiguration comprises a first regular latch storing a first portion of an operand and a corresponding first shadow latch storing a second portion of the operand, wherein the first regular latch and the first shadow latch share an address, and wherein, during a read operation, the first regular latch is read from during a first clock cycle and the first shadow latch is read from during a second clock cycle.

14. The method of claim 13, wherein:
the bit width reconfiguration enables the floating point unit that operates at the second bit width to operate on the instruction set received at the first bit width.

15. The method of claim 13, wherein:
the first bit width is a 512-bit width and the second bit width is a 256-bit width.

16. The method of claim 13, wherein:
the shadow-latch configured register file includes a plurality of shadow multiplexers (MUXs) coupled to the plurality of shadow latches.

17. The method of claim 16, wherein:
during the read operation, at least one of the plurality of shadow MUXs are used to select at least one shadow latch of the plurality of shadow latches to read from; and during a write operation, at least one of the plurality of shadow latches is activated using a write control signal during a third clock cycle of a plurality of clock cycles.

18. The method of claim 16, wherein:
during the read operation, a first shadow MUX of the plurality of shadow MUXs is used to select the first regular latch to read from during the first clock cycle and the first shadow latch to read from during the second clock cycle.

19. The method of claim 13, wherein:
the shadow-latch configured register file includes a plurality of write multiplexers (MUXs) coupled to the plurality of shadow latches.

20. The method of claim 19, wherein:
during a write operation, a first write MUX of the plurality of write MUXs is used to select the first regular latch to write to during a third clock cycle and the first shadow latch to write to during a fourth clock cycle.

21. A floating point unit, comprising:
a scheduler unit; and
a shadow-latch configured register file coupled to the scheduler unit, wherein the floating point unit employs the shadow-latch configured register file to operate using a second bit width, wherein the shadow-latch configured register file includes a plurality of regular latches and a plurality of shadow latches, wherein, as part of a bit width reconfiguration, a first regular latch is to store a first portion of an operand and a corresponding first shadow latch is to store a second portion of the operand, wherein the first regular latch and the first shadow latch share an address, and wherein, during a read operation, the first regular latch is read from during a first clock cycle and the first shadow latch is read from during a second clock cycle.

22. The floating point unit of claim 21, wherein:
the shadow-latch configured register file includes a plurality of write multiplexers (MUXs) configured to select between the plurality of shadow latches and the plurality of regular latches during a write operation.

* * * * *